Nov. 3, 1970  A. SCHWARTZ ET AL  3,537,287
TUBE CONFIGURING MACHINE
Filed Feb. 7, 1969  5 Sheets-Sheet 1
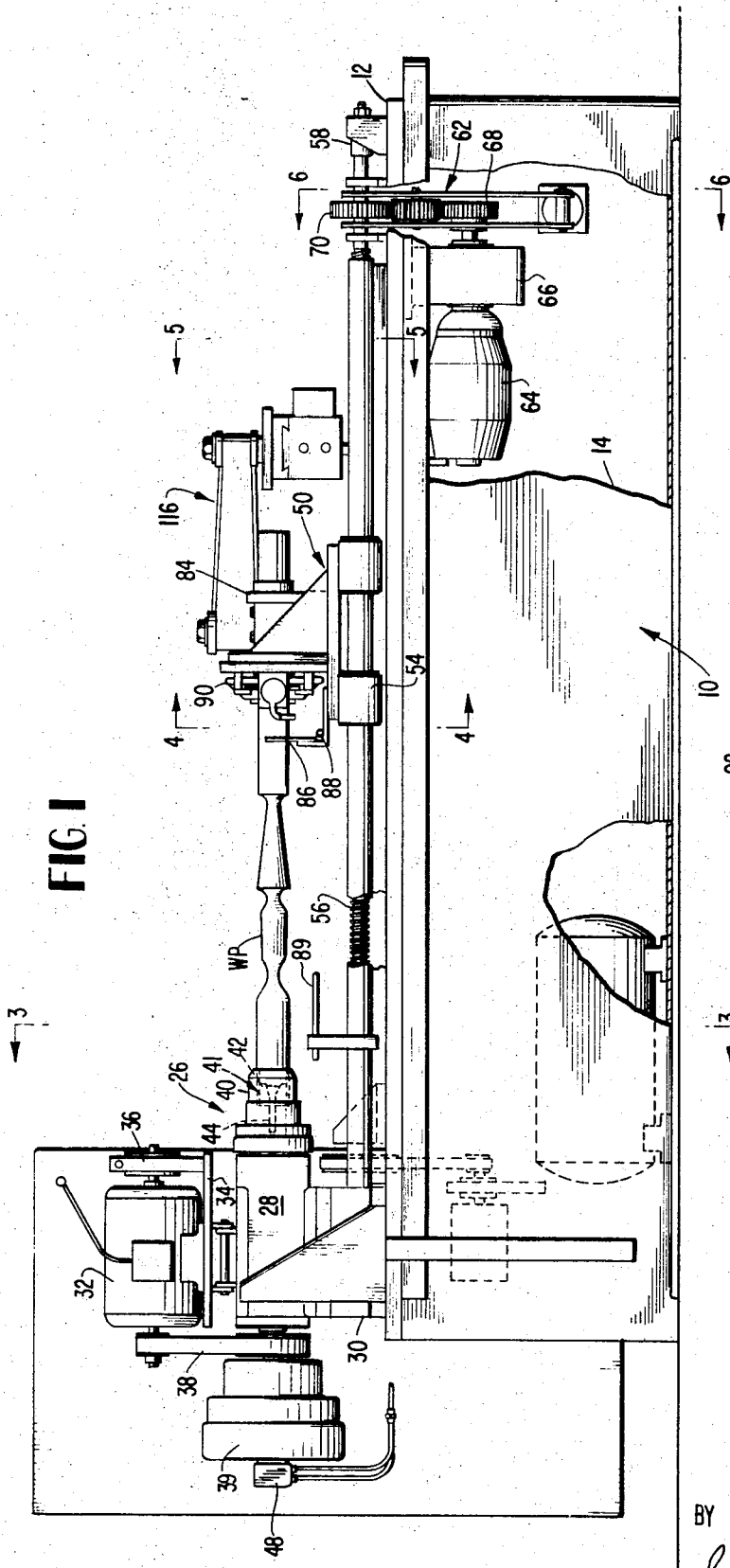
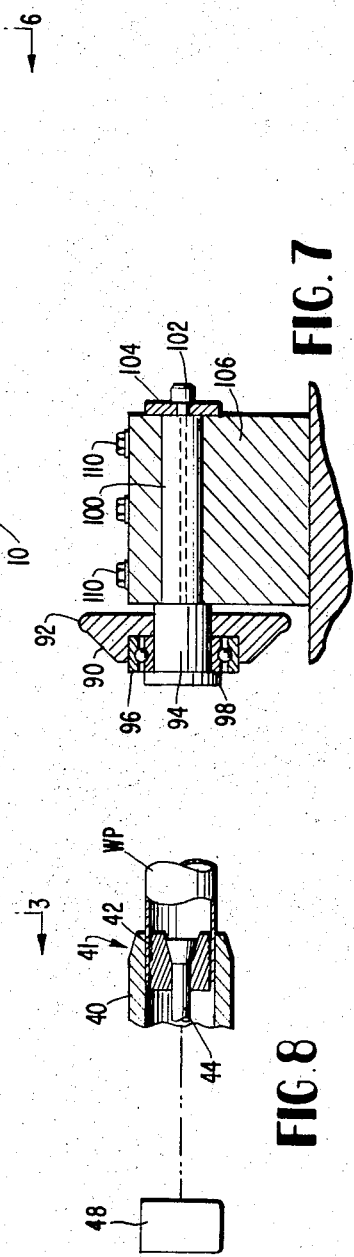
INVENTORS
ALBERT SCHWARTZ
BERNARD SCHWARTZ
BY
ATTORNEYS

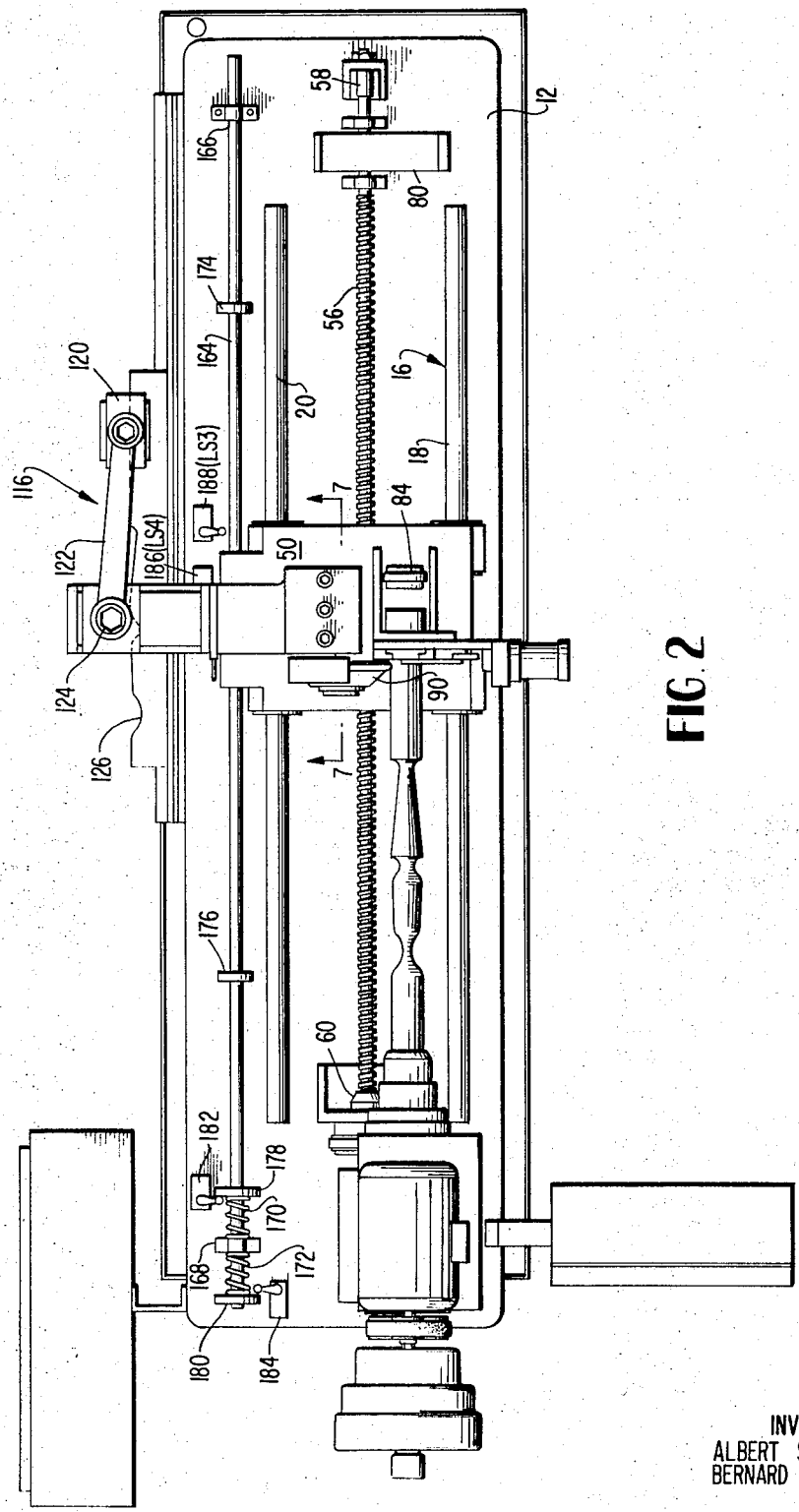

INVENTORS
ALBERT SCHWARTZ
BERNARD SCHWARTZ
BY
Sughrue, Rothwell, Mion, Zinn & Macpeak
ATTORNEYS Nov. 3, 1970

A. SCHWARTZ ET AL 3,537,287

TUBE CONFIGURING MACHINE

Filed Feb. 7, 1969

INVENTORS
ALBERT SCHWARTZ
BERNARD SCHWARTZ

BY
*Sughrue, Rothwell, Mion, Zinn & Macpeak*
ATTORNEYS

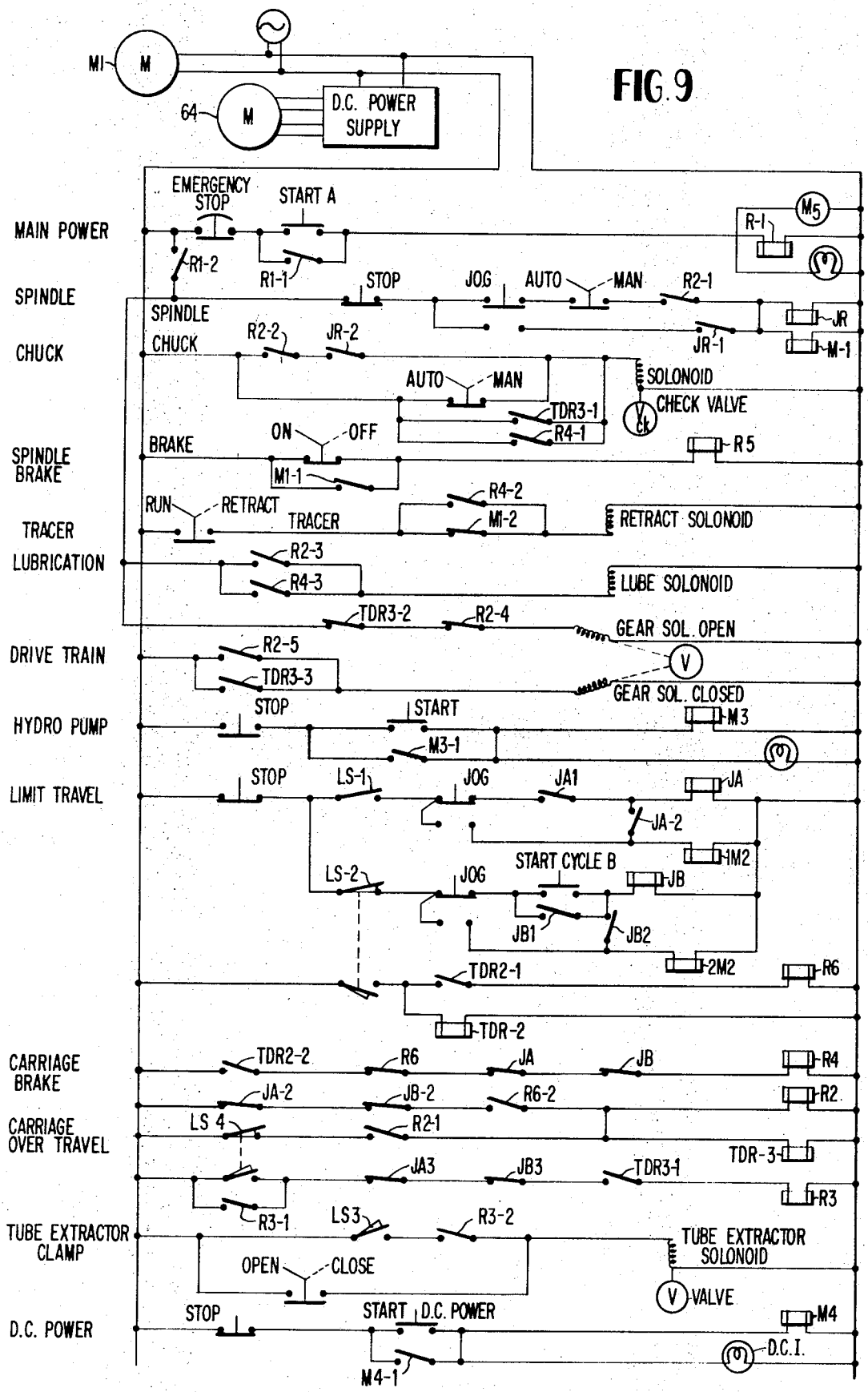

United States Patent Office 3,537,287
Patented Nov. 3, 1970

3,537,287
TUBE CONFIGURING MACHINE
Albert Schwartz, 1000 Lake Shore Plaza, Apt. 37a, Chicago, Ill. 60611, and Bernard Schwartz, 4214 Suffield Court, Skokie, Ill. 60076
Filed Feb. 7, 1969, Ser. No. 797,538
Int. Cl. B21d 22/18
U.S. Cl. 72—81                                                     12 Claims

ABSTRACT OF THE DISCLOSURE

A tube configuring machine includes a spindle with an internally expanding chuck for positively rotating a tube which is formed by a form wheel mounted on a movable carriage. The movement of the form wheel toward or away from axis of the tube to be configured is controlled by a hydraulic tracer and templet attachment on the side of the machine. The carriage is traversed longitudinally of the machine bed by a controlled speed drive and the tube is configured by the movement of the form wheel. The entire cycle is automatic from the start to finish including configuring and then removal of the tube from the spindle chuck by a clamp on the carriage which clamps the tube at the end of the configuring operation and withdraws the tube from the spindle chuck as the carriage continues to move a short distance.

BACKGROUND OF THE INVENTION

Field of the invention

This invention relates to improvements in tube configuring machines.

Description of the prior art

Tube configuring machines are generally known in the prior art, see Pats. 2,339,686, 2,265,723, for example. However, these prior art machines have a number of drawbacks in that the length of the machine is quite extensive having to accommodate the length and movement of the tubing as well as the original length of the tubing, and they are not adapted to automatic operation. While tubing configuring machines utilizing a tube rotated at a stationary position and a movable form wheel carriage are known they again leave much to be desired in the way of ruggedness and simplicity, and they are not adaptable to automatic operations. Further, the tracing arrangements in the prior art give much to be desired in the way that they are unduly complex and not powerful enough to operate at high production with some tube materials.

SUMMARY OF THE INVENTION

This invention provides a tube configuring machine in which a spindle is mounted at one end of a machine bed. The spindle has a check to rotate tubing during a configuring cycle while a carriage traverses the length of the bed carrying a form wheel, guide bearing supports and a withdrawal clamp. The carriage also carries a hydraulic tracing attachment which traces from a templet attached along the side of the machine so that low pressure of a tracing stylus on the templet directly controls high volume high pressure oil to control the forming wheel position. A withdrawal clamp carried by the carriage is actuated automatically at the end of the configuring cycle at the same time the spindle chuck is released so that as the carriage moves further, the clamp withdraws the tubing from the spindle so that it may be removed by an operator. The form wheel is cantilever mounted so that it may be easily removed. The entire machine is automatic in its electrical, pneumatic and hydraulic controls.

BRIEF DESCRIPTION OF THE DRAWINGS

The best mode contemplated of carrying out the invention will be described in connection with the accompanying drawings, in which:

FIG. 1 is a side elevation view of the machine of this invention with portions broken away for the sake of clarity.

FIG. 2 is a top plan view of the machine shown in FIG. 1.

FIG. 7 is a detailed sectional view taken along line 7—7 of FIG. 2.

FIG. 8 is a detailed sectional view of the work chuck.

FIG. 9 is an electrical circuit diagram of the machine controls.

DESCRIPTION OF THE PREFERRED EMBODIMENT

Figure 3:
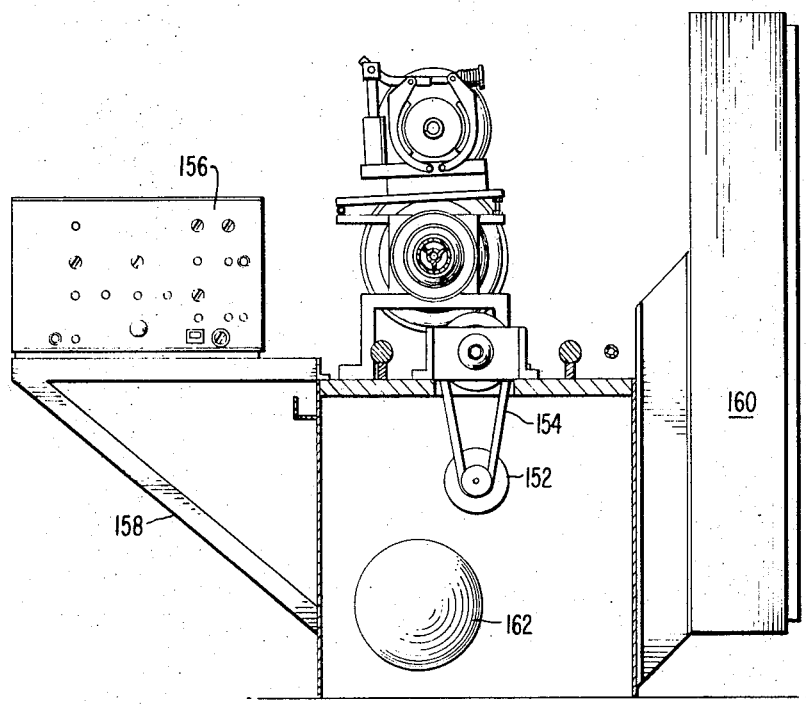
FIG. 3 is a transverse sectional view taken along line 3—3 of FIG. 1.

The machine of this invention is supported on a suitable base 10 which has a rigid bed 12 at a desired working level. Housing 14 skirts the base and covers certain of the controls and working elements.

The bed 12 carries carriage guide and support means 16 in the form of cylindrical ways 18 and 20 secured to rails 22 and 24 respectively which in turn are rigid with the bed 12.

At one end of the bed there is a driven spindle assembly 26 which includes a spindle 28 supported on a base 30 rigid with the bed 12. A spindle drive motor 32 supported on a bracket 34 is provided with a brake 36 of a commercially available type. The motor 32 drives through pulleys 38 and 39 to drive the shaft of spindle 28. The drive may be varying speeds depending on the step of lower pulley 39 to which the belt is attached. The spindle carries a removable nose piece 40 accommodating an internal chuck 41 having expandable chuck jaws 42 which are expandable outwardly by moving a draw bar 44 having a complementary tapered outer and to the left as viewed in FIGS. 1 and 8. This expands the chuck jaws 42 outwardly and their serrated edges grip the inner surface of a tubular workpiece WP and press it outwardly where the outer surface is backed up by the smooth internal surface of the nose piece 40 so that the workpiece is rigidly held and not marked by the holding of the chuck on its outside surface. The draw bar 46 is moved to the left by a suitable air cylinder 48.

Movable on the carriage guide and support means 16 is a carriage 50. The carriage is supported on the ways 18 and 20 by ball bushings 52 and 54 and is driven by means of a stationary rotatable lead screw 56 contacting a corresponding internally threaded area 57 in the carriage.

Figure 6:
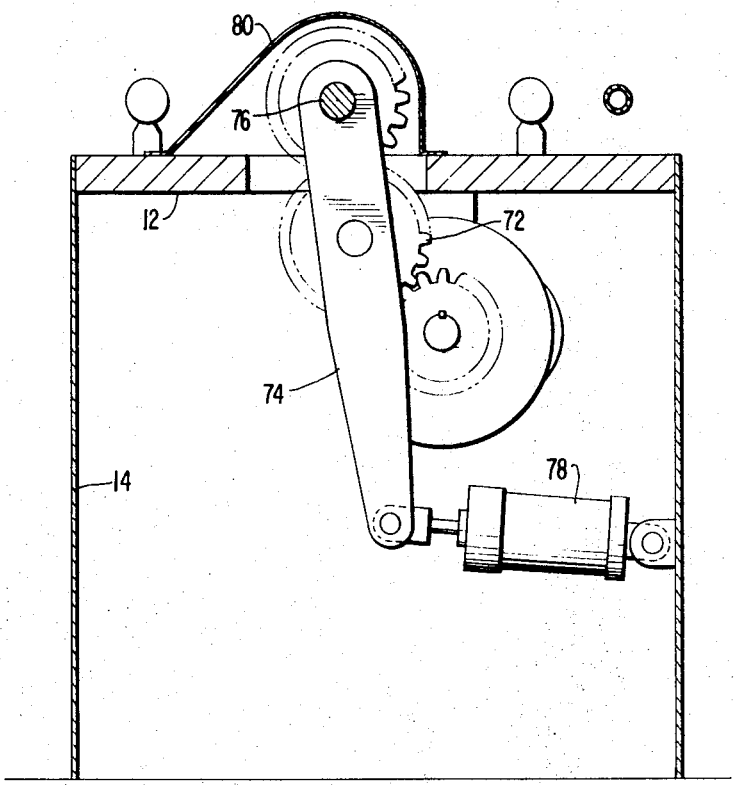
FIG. 6 is a transverse sectional view taken along line 6—6 of FIG. 1.

Each end of the lead screw 56 is rotatably mounted in thrust blocks 58 and 60 to prevent longitudinal movement and the lead screw is driven by a drive train 62 from a motor 64 under the bed 12. The drive train includes a gear box 66, pinions 68 and 70, and a movable selected gear 72, see FIG. 6. The selected gear 72 is mounted on a movable arm 74 pivoted about shaft 76 of the lead screw 56 and actuated into and out of driving engagement by a power cylinder 78. The pinion 70 is normally encased in a housing 80.

The workpiece WP is supported by suitable rests movable with and carried by a carriage 50. The primary rest is tubing rest 82 in the form of a removable bushing in a larger diameter hole in the carriage. Another rest 84 is also in the form of a removable bushing and is also carried by the carriage. Additional rests may be provided by attachments attached to the carriage at the end thereof opposite the spindle. A V rest 86 is pivoted at 88 to the front of the carriage adjacent the spindle and also supports the workpiece but is movable out of the way as the carriage moves with spindle by means of a stop 89.

Figure 4:
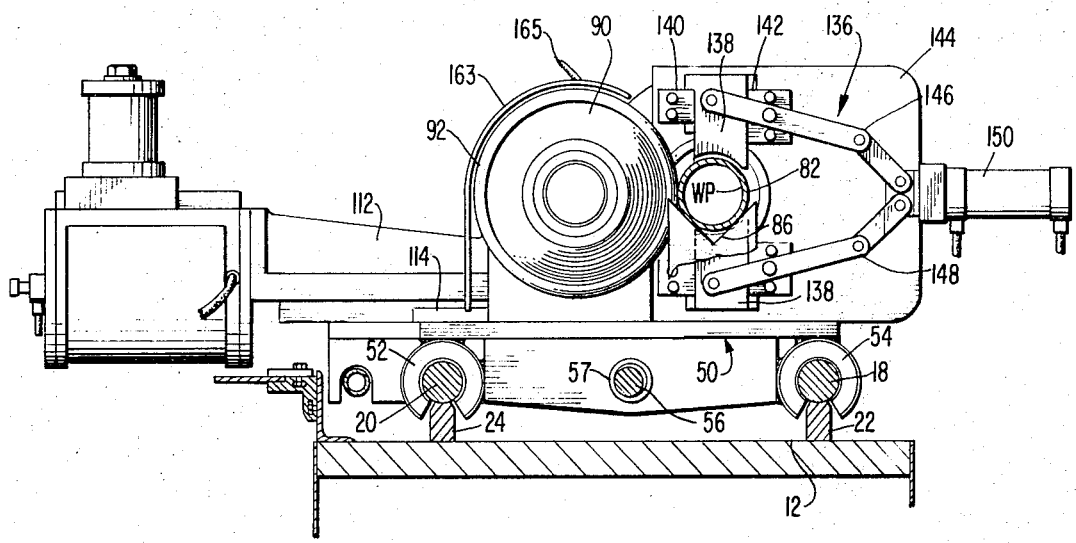
FIG. 4 is a transverse sectional view taken along line 4—4 of FIG. 1.
Figure 5:
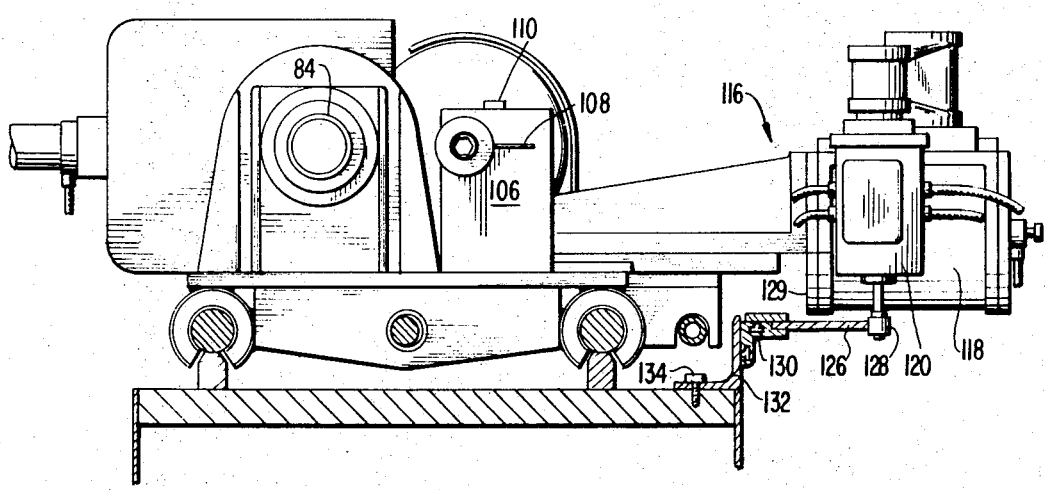
FIG. 5 is a transverse sectional view taken along line 5—5 of FIG. 1.

For forming the tubing the carriage carries a freely rotatable forming wheel 90 having a forming radius 92 on its periphery, see FIGS. 2, 4 and 7. The forming wheel is rotatable on a shaft 94 and mounted thereon by suitable bearings 96. The shaft has an outer flange 98 and a tail or mounting extension 100 so that it may be rigidly held mounted in a cantilever manner for easy removal. A screw 102 is threaded axially into the shaft tail 100 through a washer 104 to hold the shaft against its mounting support block 106. The top portion of the support block is split at 108, see FIG. 5 and screws 110 are threaded downwardly from the top of support block to apply a further holding force to the tail 100 of the shaft 94. When it is desired to remove the forming wheel to replace it with another size forming wheel having a different radius 92 all that is required is to loosen the screws 102 and 110 and slide the shaft 94 to the left as viewed in FIG. 7. Then another forming wheel can be assembled on the shaft.

The forming wheel 90 and support block 106 are movable transversely of the longitudinal axis of the carriage ways 18 and 20 by being mounted for sliding movement perpendicular to the movement of the carriage, such sliding movement being accommodated by the carriage and carried out on top of the carriage. A slide 112 is part of the forming wheel support and the carriage has corresponding guide and support ways 114 for accommodating the same.

For causing the forming wheel 90 to move toward and away from the axis of rotation of the workpiece WP and thereby form a desired contour on the workpiece there is provided a hydraulic tracer unit 116 of a commercially available type. The tracer unit has a power cylinder 118 which moves the forming wheel relative to the carriage and moves it toward and away from the center of the workpiece as desired. The power cylinder 118 is controllably positioned by hydraulic fluid passing through a tracer valve 120 mounted on the end of an arm 122 which in turn is adjustably positioned by loosening or tightening nut 124.

The pattern to be formed in the tubing being configured is first formed in a template 126 and this template is rigidly mounted on the side of the base to be contacted by a curved template follower roller 128 on the end of a stylus 129 controlling the tracer valve 120. The template follower roller 128 has the same radius of curvature as the forming radius 92 of the forming wheel 90.

The template 126 is secured to an angle support 130 which in turn is rigidly attached to a slotted channel 132 attached to the base by screw 134. By adjusting the position of channel 132, the longitudinal axis of the template 126 can be adjusted until it is exactly parallel with the longitudinal axis of the workpiece WP.

For removing the workpiece WP after the configuring has been completed the carriage carries a withdrawal clamp 136, see FIG. 4. This clamp includes clamp jaws 138 movable toward and away from each other between guide blocks 140 and 142 which in turn are supported on carriage upright 144 which mounts the removable tubing rest 82. A pair of pivoted toggle arms 146 and 148 are actuated by a power cylinder 150 to move the clamping jaws 138 toward each other to clamp the workpiece or away from each other to release the workpiece. In operation, during forming of the tube, the forming wheel contacting the positively rotated tubing causes the wheel to rotate and at the end of the forming the forming wheel retracts, the tubing clamp actuates to clamp the end of the tubing, the spindle chuck releases and the carriage continues to move to the right as viewed in FIGS. 1 and 2 to pull the tubing out of the spindle chuck. Thereafter, following a short time delay the withdrawal clamp releases completely releasing the tubing for manual removal from the machine.

As shown in FIG. 3 the machine also includes a further motor 152 and a drive 154 for rapid drive of the lead screw 56. An automatic control panel 156 is supported on bracket 158 beside the machine is provided as a console control for an operator. The automatic circuitry shown in FIG. 9 is at least partially carried within a relay cabinet 160. Compressed air for operating some of the power operators and actuators is stored in tank 162 under the bed 12.

A suitable splash shield 163 is provided around the forming wheel to prevent the splashing of forming lubricant supplied to the wheel through tube 165 as required.

Part of the automatic controls of the machine include a longitudinal control rod 164, see FIG. 2 which is mounted for longitudinal movement in bushings 166 and 168 but is biased to a normal position by springs 170 and 172 sandwiching bushing 168 and abutting against collars 178 and 180 attached to the control rod 164. Limit switches 182 and 184 are actuated by the collars 178 and 180 respectively during recycle and additional limit switches 186 and 188 are actuated by the carriage 50 at the end of the cycle. These switches may be adjustably mounted on the rail 130 depending on the length of the workpiece WP. The carriage 50 also contacts collars 174 and 176 which are adjustably positioned on rod 164 and on contacting the collars moves the entire rod which causes collars 178 and 180 to actuate switches 182 and 184 and hence determine the limits of movement of the carriage.

The operation of the machine will now be described in connection with the circuit diagram of FIG. 9. The operator first pushes the start switch A energizing R–1 and M5 starting the main power. Then start cycle switch B is closed causing the relay JB to close contacts JB1, JB2 and operate relay 2M2. (Assuming the carriage is in position such that LS2 (182) has not been opened.) The next step is to turn on the D.C. power by pushing the start switch for D.C. power which closes relay M4 closing contacts M4–1, holding the relay and actuating the D.C. power supply to the D.C. drive motor 64 through further M4 contacts not shown. An indicator lamp D.C.I. indicates the D.C. power is on. Next, the hydro pump is switched on by pushing its start button throwing relay M3 closing contacts M31 and holding relay M3 lighting the lamp in that circuit and starting the hydro pump through further contacts of M3, not shown. The various stop switches indicated on a circuit diagram are emergency stop switches and there are actuating buttons on the side of the machine. Various other switches include the spindle brake which is normally on, the spindle which is normally automatic, the spindle chuck which is normally automatic, the tracer which is normally on run, the tube extractor which is normally open. If anything goes wrong, the first switch to throw is to retract the tracer throwing the tracer switch from run to retract.

With the main power on, the A.C. power on, the D.C. power on, and the hydro pump power on the carriage is appropriately positioned if it is already not in position to load a tube WP to be configured. This may be accomplished, if the carriage needs to be backed up, by pushing the reverse jog energizing 2M2 causing motor 64 to rotate the lead screw to move the carriage in reverse position. The operator then loads the workpiece or tube WP by placing it in the rests 82 and 84 on the carriage 50, the operator then pushes the forward jog actuating relay 1M2 causing the motor 64 to drive the carriage toward the spindle and the operator hand guides the end of the tubing to be configured into the nosepiece 40 of the spindle around the chuck jaws 42. Then the start cycle button is pushed operating relay JB which in turn establishes contact through relay 2M2 causing the carriage to move forward toward the spindle. At this time, the spindle chuck is engaged via the automatic chuck solenoid valve and the tube is rotated quite rapidly. At the time the carriage is at the spindle end it will abut against collar 176, move rod 164 to the left as viewed in FIG. 2, and actuate LS2 (switch 182) to stop the forward movement. At the same time LS2 is opened to stop the movement another contact of LS2 is closed to energize relay TDR-2 actuating relay R6 and the tracer moves forward to place the forming wheel in contact with the workpiece tube periphery. At that time, forming is ready to begin. After a short time delay, TDR2-2 operates releasing the carriage brake and the carriage starts moving away from the spindle at the same time the hydraulic tracer is moving the forming wheel in and out according with the template pattern 126. This causes the configuration to be formed in the workpiece as desired. Near the end of the operation the carriage 50 hits limit switch LS4 (186) adjustably mounted on the rail depending on the length of the workpiece and the template. On hitting the first limit switch LS4 closes energizing R3 and speeding up the movement of the carriage. The carriage then moves fairly rapidly a short distance until limit switch LS3 (188) is actuated energizing tube extractor solenoid valve 150 causing the clamp to clamp onto the tube while the carriage is moving further. The contacts TDR3-1 open a short period of time later stopping the travel of the carriage and releasing the clamp. The spindle chuck is released at the same time the tube extractor clamp is actuated so that further movement of the carriage can pull the workpiece out of the chuck. At this time, the operator can remove the sculptured or configured tubing because of the release of the tube extractor clamp.

When it is desired to change from one pattern to another using the same size tubing all that is necessary to do is to quickly remove the clamps holding the template 126 and replace the template with another positioned at the same position. If the template and tubing are longer, the limit switches 186, 188 would be adjusted to the appropriate position.

To change to another set of conditions including a different size tubing, different size forming wheels and different speeds, the speed of the a.c. drive spindle would be changed by changing the pulley, the nose plate 40 of the chuck would be exchanged for one having a chuck of a different size, the forming wheel would be removed and exchanged for another one, and the rests 82 and 84 in the carriage would be exchanged to accommodate the different size tubing.

As can be seen, the machine of this invention provides an automatic, quickly and easily operable tubing sculpturing machine which may be successfully used with a number of different operating parameters.

We claim:
1. A metal configuring machine comprising:
   (a) an elongated machine base including carriage guide and support means extending longitudinally thereon,
   (b) a driven spindle supported on one end of the base,
   (c) a power operated chuck carried by the spindle for holding metal tubing to be configured, the tubing being rotated by the spindle,
   (d) a driven carriage movable on the guide and support means of the machine bed,
   (e) tubing rest means carried by the carriage and aligned axially with the spindle chuck,
   (f) a forming wheel having a curved working periphery supported on a shaft journalled in a forming wheel slide,
   (g) guide means on the carriage for suporting the forming wheel slide for movement transverse to the movement of the carriage on the machine base,
   (h) a hydraulic tracer unit carried by the carriage and and operable to move the forming wheel slide in accordance with a pattern in a template carried by the machine base, the template being contacted by a curved follower of the hydraulic tracer unit,
   (i) a selectively actuatable clamp carried by the carriage for clamping a metal tubing at the end of a configuring cycle, and
   (j) automatic controls for controlling a configuring cycle and including control of the spindle drive, power operated chuck, carriage drive, hydraulic tracer, and clamp.

2. A metal configuring machine as in claim 1 wherein the power operated chuck is an expanding collect chuck expanding outwardly on axial movement of a powered drawbar wedge to hold an end of a tubing workpiece within an end of a nosepiece on the spindle.

3. A metal configuring machine as in claim 2 wherein the driven spindle includes means to change the spindle drive speed.

4. A metal configuring machine as in claim 1 wherein the carriage guide and support means includes parallel longitudinal rods, and the carriage has guide bearings cooperating with the rods, and a variable speed driven lead screw extending longitudinally of the base between the rods provides the carriage drive from an electric motor.

5. A metal configuring machine as in claim 1 wherein the tubing rest means includes guide bushings interchangeable carried in bushing mounts in an upstanding portion of the carriage.

6. A metal configuring machine as in claim 5 wherein the tubing rest means further comprises an additional tubing rest carried by the carriage on the side thereof opposite the spindle.

7. A metal configuring machine as in claim 6 wherein the tubing rest means further comprises a pivoted tubing support on the side of the carriage adjacent the spindle.

8. A metal configuring machine as in claim 1 wherein the radius of the curved working surface of the forming wheel equals the radius of the curved template follower.

9. A metal configuring machine as in claim 8 wherein the forming wheel shaft is cantilever mounted in the forming wheel slide and the forming wheel is freely rotatable on said shaft.

10. A metal configuring machine as in claim 1 wherein the template is clamped to a rail for easy removal and replacement, and the rail is adjustably mounted on the machine base for adjustment.

11. A metal configuring machine as in claim 1 wherein the clamp is an air actuated toggle clamp controlled by the automatic controls.

12. A metal configuring machine as in claim 1 wherein the automatic controls include variably positioned limit switches on the base actuated by movement of the carriage.

References Cited
UNITED STATES PATENTS

| | | | |
|---|---|---|---|
| 2,265,723 | 12/1941 | Dewey et al. | 72—81 |
| 2,339,686 | 1/1944 | Dewey et al. | 72—81 |
| 2,410,052 | 10/1946 | Dewey | 72—69 |
| 3,041,990 | 7/1962 | Le Fiell | 72—84 |

RICHARD J. HERBST, Primary Examiner